United States Patent
Barman et al.

(10) Patent No.: US 9,313,078 B1
(45) Date of Patent: Apr. 12, 2016

(54) PULSE CANCELLATION CREST FACTOR REDUCTION WITH A LOW SAMPLING RATE

(71) Applicant: Xilinx, Inc., San Jose, CA (US)

(72) Inventors: Kaushik Barman, Hyderabad (IN); Gregory C. Copeland, Savannah, TX (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 14/682,737

(22) Filed: Apr. 9, 2015

(51) Int. Cl.
  H04K 1/02  (2006.01)
  H04L 27/36  (2006.01)
  H04L 27/04  (2006.01)
  H04L 27/12  (2006.01)

(52) U.S. Cl.
  CPC .............. H04L 27/368 (2013.01); H04L 27/04 (2013.01); H04L 27/12 (2013.01)

(58) Field of Classification Search
  CPC ................... H04L 25/0232; H04L 25/03159; H04B 1/0475; H04B 1/7107; H04B 2201/70706; H04B 1/109; H04B 1/525; H04B 7/15585; H04B 2001/71077
  USPC ............ 375/346, 285, 148, E1.029; 455/296, 455/88, 114.2
  See application file for complete search history.

(56) References Cited

U.S. PATENT DOCUMENTS

| | | | | |
|---|---|---|---|---|
| 4,835,723 A | * | 5/1989 | Hansen .............. | H03H 17/0621 708/300 |
| 8,649,471 B1 | * | 2/2014 | Charbonneau ...... | H04L 27/2624 341/132 |
| 2014/0044215 A1 | * | 2/2014 | Mundarath ......... | H04L 27/2624 375/297 |

OTHER PUBLICATIONS

Proakis, John G., Digital Communications, 4th Edition, 2000, Section 2-2-4, pp. 72-73, McGraw Hill, Columbus, Ohio, USA.

Väänänen, Jouko Vankka et al., "Reducing the Peak to Average Ratio of Multicarrier GSM and Edge Signals," Proc. of the 13th IEEE International Symposium on Personal, Indoor and Mobile Radio Communications, Sep. 18, 2002, pp. 115-119, vol. 1, IEEE, Piscataway, New Jersey, USA.

Xilinx, LogiCORE IP Peak Cancellation Crest Factor Reduction v2.0, XMP039, Dec. 2, 2009, pp. 1-3, Xilinx, Inc., San Jose, California, USA.

Xilinx, LogiCORE IP Peak Cancellation Crest Factor Reduction v3.1 Product Guide, PG097, Dec. 18, 2012, pp. 1-83, Xilinx, Inc., San Jose, California, USA.

Xilinx, Peak Cancellation Crest Factor Reduction Reference Design, XAPP1033 (v1.0), Nov. 18, 2007, pp. 1-31, Xilinx, Inc., San Jose, California, USA.

* cited by examiner

*Primary Examiner* — Rahel Guarino

(74) *Attorney, Agent, or Firm* — W. Eric Webostad

(57) ABSTRACT

A method relates generally to data transmission. In such a method, a peak detector detects a signal peak of an input signal exceeding a threshold amplitude. This detecting includes sampling the input signal at a sampling frequency to provide a sampled signal. The sampling frequency is in a range greater than a bandwidth frequency of a carrier signal used for providing the input signal and less than twice the bandwidth frequency. Samples of the sampled signal proximate to the signal peak are interpolated to provide a reconstructed peak. A cancellation pulse is applied by a cancellation pulse generator to the samples to reduce the signal peak. A version of the input signal is output after application of the cancellation pulse.

20 Claims, 9 Drawing Sheets

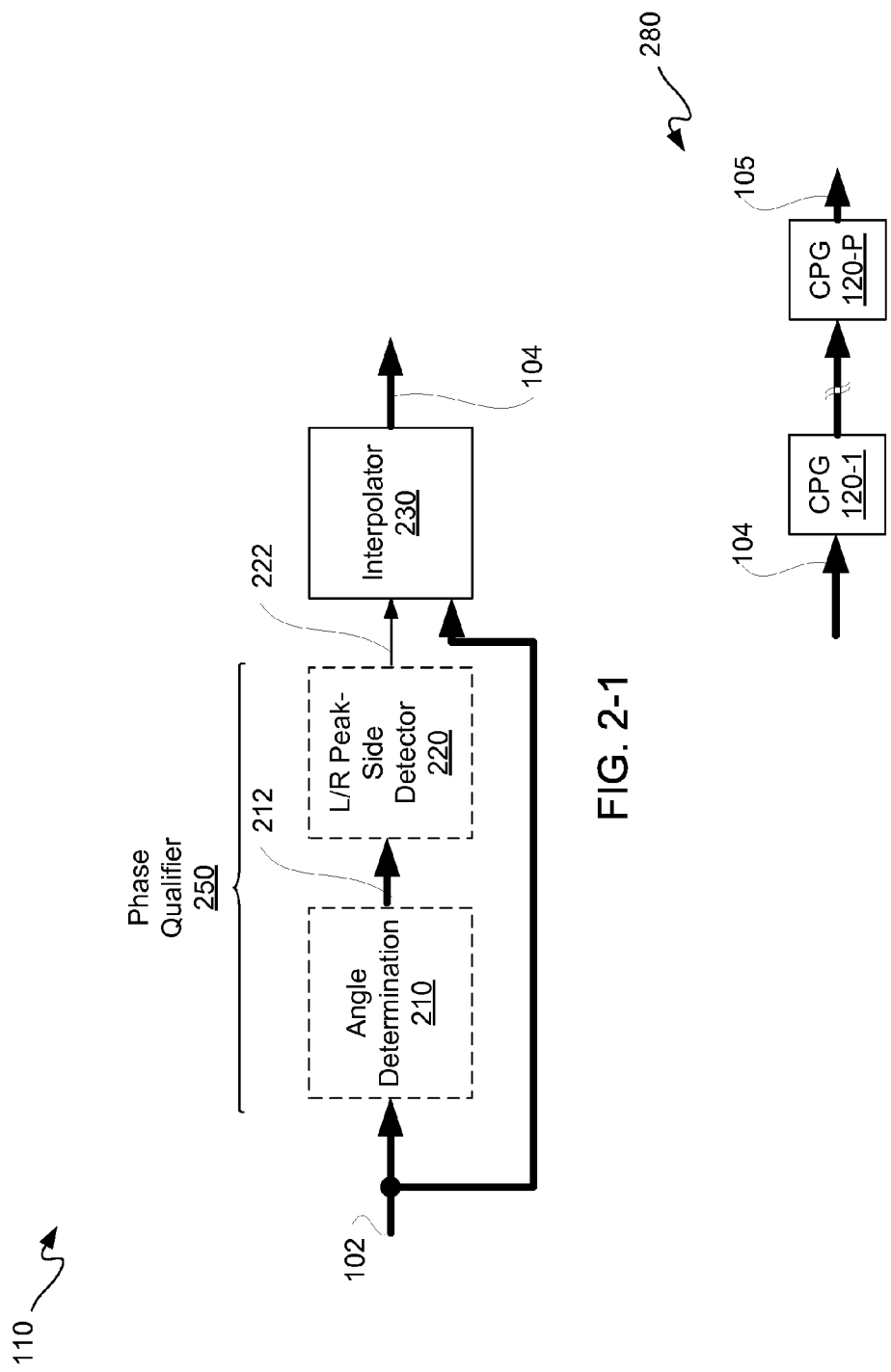

PULSE CANCELLATION CREST FACTOR REDUCTION WITH A LOW SAMPLING RATE

TECHNICAL FIELD

The following description relates to integrated circuit devices ("ICs"). More particularly, the following description relates to pulse cancellation crest factor reduction with a low sampling rate for an IC.

BACKGROUND

Crest Factor Reduction ("CFR") is used to limit the dynamic range of signals being transmitted in wireless communications and other applications. Multiuser and multi-carrier signals may have a high peak-to-average ratio ("PAR"). A high PAR places a high demand on data converters and may limit the efficiency of operation of a power amplifiers ("PAs") used in cellular base stations. Reducing PAR is therefore beneficial in increasing PA efficiency by allowing higher average power to be transmitted before saturation occurs.

Along those lines, peak-cancellation-CFR ("PC-CFR") cores have been used to process control and data through a transmitter. Such PC-CFR cores are described in additional detail in "LogiCORE IP Peak Cancellation Crest Factor Reduction", by Xilinx, Inc., XMP039, published Dec. 2, 2009 (ver. 2.0). As indicated in this document, resource requirements and performance may be substantially dependent on data rate and the number of cancellation pulse generators used in an implementation. Along those lines, in a conventional PC-CFR implementation, such PC-CFR may run at 3×-5× of an up-sampled signal for accurate peak detection and cancellation. Thus, for example for an 80 MHz signal bandwidth with 4× sampling, processing may have to be at least at 4×80 MHz, or a 320 MHz sampling rate, with cancellation pulse generators operating at such sampling frequency. This does not take into account any margin for error, namely any guard bands, which may increase such sampling rate.

Accordingly, it would be desirable to provide cancellation pulse generation with a lower sampling frequency than 3× of a bandwidth frequency.

SUMMARY

A method relates generally to data transmission. In such a method, a peak detector detects a signal peak of an input signal exceeding a threshold amplitude. This detecting includes sampling the input signal at a sampling frequency to provide a sampled signal. The sampling frequency is in a range greater than a bandwidth frequency of a carrier signal used for providing the input signal and less than twice the bandwidth frequency. Samples of the sampled signal proximate to the signal peak are interpolated to provide a reconstructed peak. A cancellation pulse is applied by a cancellation pulse generator to the samples to reduce the signal peak. A version of the input signal is output after application of the cancellation pulse.

An apparatus relates generally to data transmission. In such an apparatus, a peak detector is for receiving an input signal for detecting a signal peak in the input signal exceeding a threshold amplitude. The peak detector is for sampling the input signal at a sampling frequency to provide a sampled signal. The sampling frequency is in a range greater than a bandwidth frequency of a carrier signal used for providing the input signal and less than twice the bandwidth frequency. The peak detector is for interpolating samples of the sampled signal proximate to the signal peak. A cancellation pulse generator is for applying a cancellation pulse to the input signal to reduce the signal peak.

A system relates generally to a transmitter. In such a system, a peak detector is for receiving an input signal for detecting a signal peak in the input signal exceeding a threshold amplitude. The peak detector is for sampling the input signal at a sampling frequency to provide a sampled signal. The sampling frequency is in a range greater than a bandwidth frequency of a carrier signal used for providing the input signal and less than twice the bandwidth frequency. The peak detector has an angle determination block for receiving the input signal for providing an activation signal indicating samples of the sampled signal are associated with a peak. The peak detector further has a peak-side detector for receiving the activation signal for selecting either a left side order of the samples or a right side order of the samples of the signal peak. The peak detector yet further has an interpolator for interpolating either the left side order of the samples or the right side order of the samples selected. A cancellation pulse generator is for applying a cancellation pulse to the input signal to reduce the signal peak for outputting a version of the input signal. A windowed crest factor reduction block is for cleaning the version of the input signal.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 2-1 is a block diagram depicting an exemplary peak detector of FIG. 1.

FIG. 2-2 is a block diagram depicting an exemplary series cancellation pulse generators ("CPGs").

FIGS. 4-1 and 4-2 collectively are a mathematical representation ("Equation (1)") depicting an exemplary interpolator having a left-side peak portion and a right-side peak portion.

DETAILED DESCRIPTION

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Before describing the examples illustratively depicted in the several figures, a general introduction is provided to further understanding.

Wireless or cellular base stations may employ multi-carrier air interface technologies to make efficient use of available Radio Frequency (RF) spectrum. Conventionally, a digital up-converter ("DUC") may be used to translate different baseband channels at predetermined offsets in a frequency domain for adding them together to produce multi-carrier signal. Thus, such a multi-carrier or multiuser signal being readied for transmission may have a high peak-to-average power ratio ("PAR"). To reduce or back-off a dynamic range of such multi-carrier or multiuser signal prior to input to a power amplifier ("PA"), PAR may be reduced to increase PA efficiency by allowing higher average power to be transmitted before saturation occurs.

Conventionally, crest factor reduction (CFR) in a transmitter is used to limit the PAR of a transmitted signal. A conventional form of CFR is peak-cancellation crest factor reduction ("PC-CFR"). PC-CFR detects peaks above a predetermined or preset threshold with respect to a transmitted complex signal envelope and then cancels those peaks above such threshold using a suitable cancellation pulse ("CP").

In order to detect peaks in such a signal envelope with sufficient accuracy, incoming samples may be interpolated. This interpolation increases complexity of data path blocks, such as adders and multipliers, among other data path blocks. As described below in additional detail, such processing may be performed substantially below a 3× of a bandwidth frequency of such a signal envelope. This reduction in sampling frequency may be used to reduce data path complexity, including without limitation to reduce complexity associated with interpolation while providing sufficient peak detection accuracy.

With the above general understanding borne in mind, various configurations for PC-CFR are generally described below.

Figure 1:
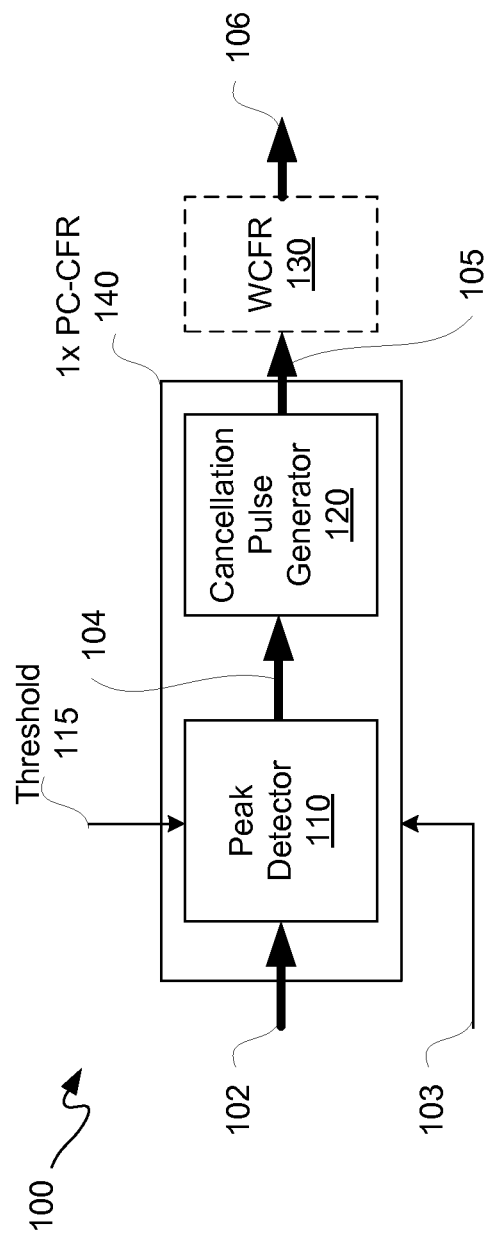
FIG. 1 is a block diagram depicting an exemplary peak-to-average power ratio ("PAPR") reduction system.

FIG. 1 is a block diagram depicting an exemplary peak-to-average power ratio ("PAPR") reduction system 100. PAPR system 100 includes a "1×" peak cancellation, crest factor reduction ("PC-CFR") block 140 coupled to an optional windowed-CFR block 130. As a crest factor, C, is generally squared to provide a PAPR, the following description is generally for crest factor for purposes of clarity. However, for signal processing applications, reducing PAPR may be useful as previously described.

By "1×", it is generally meant that a sampling frequency is in a range greater than a bandwidth frequency used for providing an input signal 102 and less than twice such a bandwidth frequency. While generally any frequency greater than a Nyquist rate may be used for sampling, "1× PC-CFR block 140 may be generally used to avoid using sampling rates greater than twice a Nyquist rate. Generally, a 10 to 30 percent guard band is used for sampling, namely a sampling rate of approximately a 1.1 to 1.3 multiple of a bandwidth frequency. Thus, for purposes of clarity by way of example and not limitation, it shall be assumed that a 1.2 sampling rate is used for "1×" sampling, even though another sampling rate may be used within a range of greater than 1× a Nyquist rate and less than 2× such a Nyquist rate for a system.

For a 1× PC-CFR block 140, such a PC-CFR block may include a peak detector 110 and a cancellation pulse generator ("CPG") 120. Peak detector 110 may be coupled for receiving a threshold input 115 and an input signal 102 for detecting a signal peak in such input signal exceeding a threshold amplitude indicated by such threshold input 115 setting. For this example, it shall be assumed that 1× PC-CFR block 140 is for preparing input signal 102 for transmission prior to input to a power amplifier of a transmission system. Along those lines, it shall be assumed that bandwidth frequency is of a carrier signal used to carry a plurality of input signals, including input signal 102, namely a multicarrier signal. Along those lines, such input signals 102 may have same and/or different bandwidth frequencies offset from one another at different center frequencies respectively.

Peak detector 110 may be configured for sampling input signal 102 at a sampling frequency, such as a core frequency of a core clock signal 103 provided to 1× PC-CFR 140, to provide a sampled signal, as well as input signal 102, in output signal 104. Such sampled signal may have samples of input signal 102 at least proximate to peaks thereof, and multiple phases of samples may be provided as sampled signals in output signal 104. While rate of core clock signal 103 may be used as a sampling frequency for peak detector 110 and a clock rate of CPG 120, in another implementation such a sampling frequency and clock rate may be different with both frequencies being in a range of approximately a 1.0 to 2.0 multiple of a Nyquist rate of input signal 102.

Peak detector 110 may be configured for interpolating samples of sampled input signal 102 proximate a signal peak of input signal 102. Accordingly, samples associated with signal peaks of input signal 102 may be interpolated from samples of input signal 102.

Figures 1, 4:
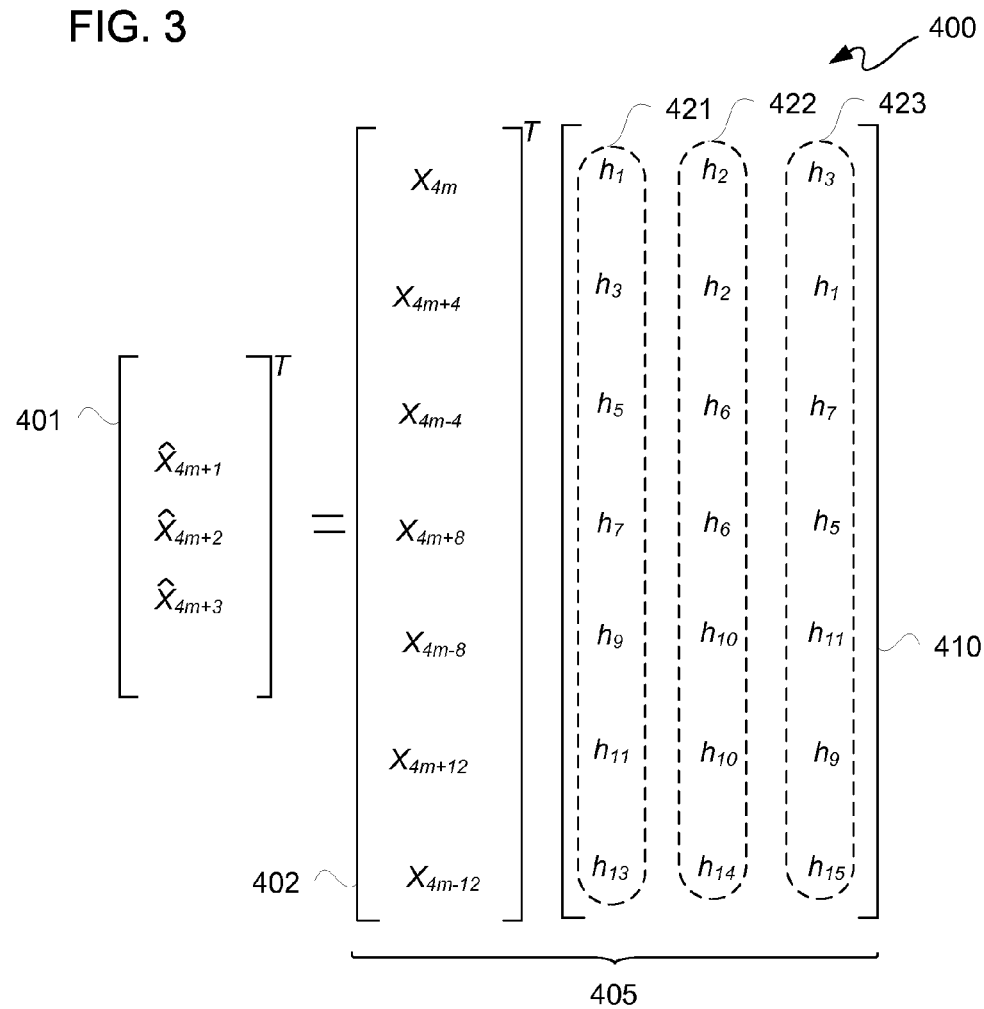
Figures 2, 4:
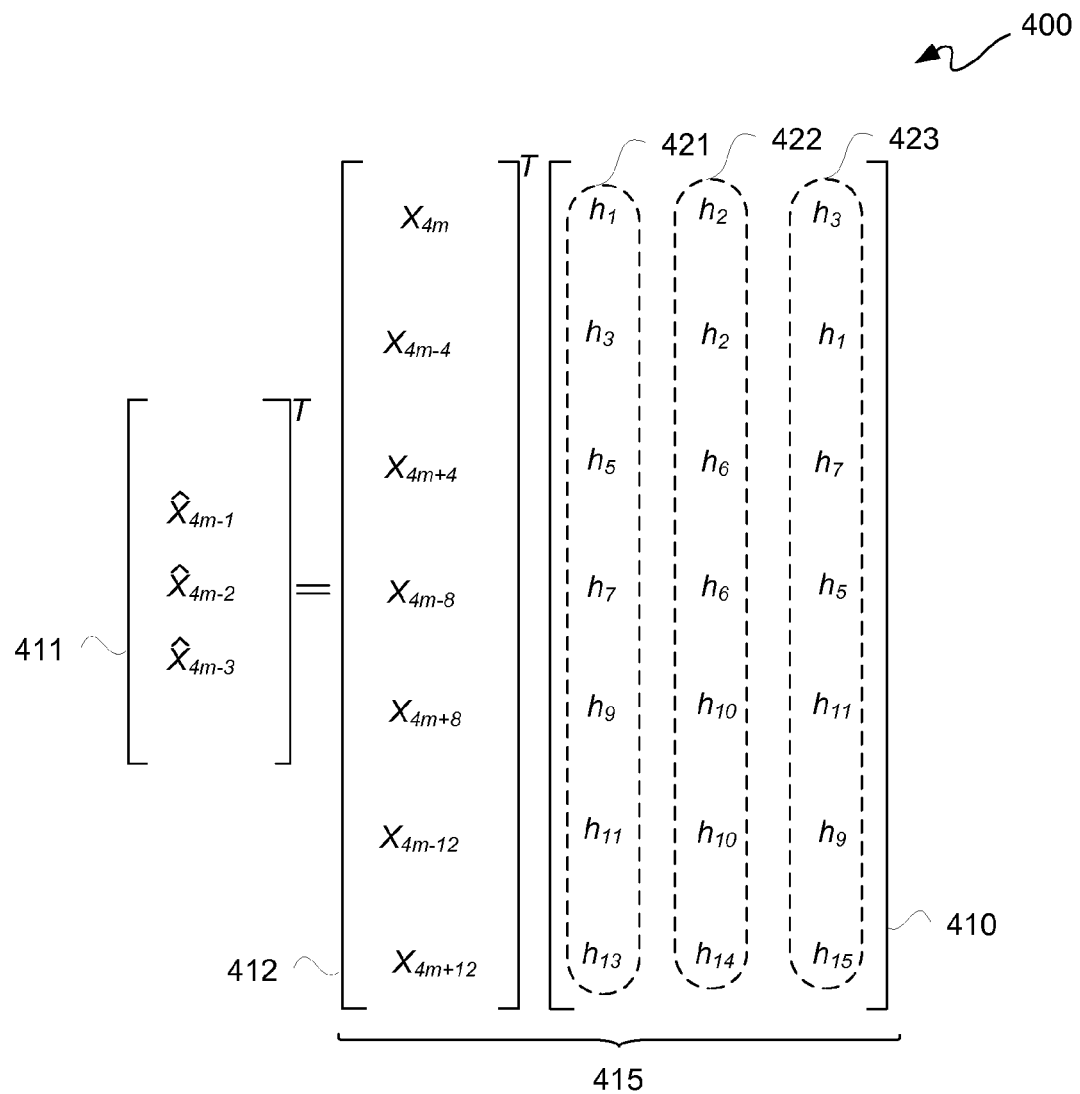

FIG. 2-1 is a block diagram depicting an exemplary peak detector 110 of FIG. 1. FIG. 2-2 is a block diagram depicting an exemplary series CPG 280. Series CPG 280 may be a CPG 120 of FIG. 1.

With reference to FIGS. 1 and 2-1, peak detector 110 may include an interpolator 230, and optionally may include an angle determination block 210 and/or a left/right ("L/R") peak-side detector 220. Peak detector 110 and PAPR system 100 are further described with simultaneous reference to FIGS. 1 and 2. Along those lines, it shall be assumed that optional windowed crest factor reduction block ("WCFR") 130, optional angle determination block 210, and optional L/R peak-side detector 220 are included, even though in other implementations one, two, or all of these blocks may be omitted.

Output signal 104 of peak detector 110 may be provided as an input to cancellation pulse generator 120. Cancellation pulse generator 120 may be configured for applying a cancellation pulse to samples to reduce a signal peak in input signal 102. Output power or signal RMS of output signal 105 from cancellation pulse generator 120 may be slightly reduced in amplitude as compared with that of input signal 102, namely where peaks in input signal 102 are reduced to be at or below a predefined threshold, such as a threshold amplitude. Optional WCFR 130 may further slightly reduce such output power.

Along those lines cancellation pulse generator 120 may apply a cancellation pulse to incoming samples when a signal peak associated therewith crosses a predefined threshold. Such a cancellation pulse may be scaled corresponding to amplitude of a detected peak, and then such scaled cancellation pulse may be applied to input samples, where components of such cancellation pulse may be at least approximately aligned with components or samples of a signal peak to be compensated for with such cancellation. This compensation may reduce such signal peak to a value lower than, or equal to, such a set threshold.

Peak interpolation and cancellation by 1× PC-CFR 140 may leave some under-corrected peaks in output signal 105, as finite tap interpolation is an approximation to a band-limited sinc counterpart of 1× PC-CFR 140. Accordingly, efficiency may be enhanced by coupling a post processing stage to "clean-up" residual leftover peaks in output signal 105. Generally, any finite tap band-limited interpolation, for example such as a truncated or windowed sinc, may use or be coupled to a post processing stage for such "clean-up".

Along those lines, a WCFR 130 may be coupled to receive output signal 105 as a post processing stage for such "clean-up." WCFR 130 may assist in cutting down CFR iteration(s). For example, peaks in composite input signal 102 with difficult and wide carrier configurations may be cancelled with approximately two to four iterations of CPG 120 of 1× PC-CFR 140, such as with multiple cascaded instances in a feed forward data path as illustratively depicted in FIG. 2-2, followed by a WCFR 130 post processing for cleaning a scaled input signal to provide an output signal 106. Accordingly, output signal 106 may be a cleaned-up version of output signal 105, after one to four iterations for example. For iterative processing, CPG 120 may include a plurality of CPGs 120-1 through 120-P, for P a positive integer greater than one, coupled in series, as generally indicated in the block diagram of FIG. 2-2.

Figure 3:
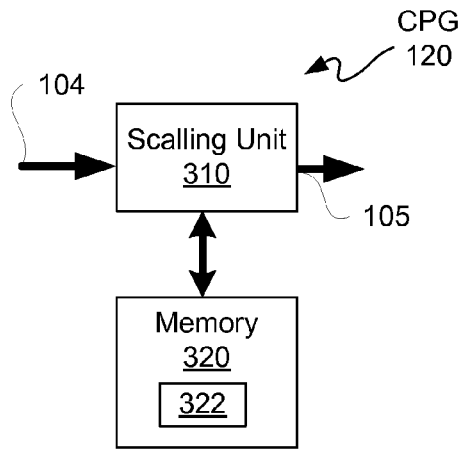
FIG. 3 is a block diagram depicting an exemplary cancellation pulse generator ("CPG").

FIG. 3 is a block diagram depicting an exemplary cancellation pulse generator ("CPG") 120. CPG 120 may include a complex number scaling unit 310 and a memory 320. Scaling unit 310 may be coupled for receiving output signal 104, which may include a delayed version of input signal 102 and one or more sampled signal phases of input signal 102. Scaling unit 310 may use information in output signal 104 for determining a cancellation pulse to be applied to samples of input signal 102.

Memory 320 of CPG 120 may be coupled to scaling unit 310. Scaling unit 310 may obtain complex coefficients from a store of complex coefficients 322 in memory 320 for determining a cancellation pulse to be used. Scaling unit 310 may include multipliers and other data path components. Along those lines, such multipliers of scaling unit 310 may be for multiplying samples of input signal 102 with such complex coefficients obtained from memory 320 for a cancellation pulse to scale down a peak of input signal 102.

Scaling unit 310 may be implemented with multipliers of a system-on-chip ("SoC"), such as an FPGA, or other IC. For purposes of clarity by way of example and not limitation, it shall be assumed that an FPGA implementation is used with BRAM for cancellation pulse lookup and DSP blocks for multipliers. However, in other implementations, other types of look-up table storage and/or other data path components may be used.

Continuing the above example for purposes of clarity and not limitation, a sampling frequency may be at least approximately a bandwidth frequency of 80 MHz multiplied by 1.2 to provide a sampling frequency of 96 MHz. A core clock signal may be an integral multiple of a sampling rate for reuse. Along those lines, if a core clock signal rate of a CPG 120 is maintained at 288 MHz (i.e., 3×96 MHz) or a 384 MHz (i.e., 4×96 MHz) sampling rate for reuse factors of 3 and 4 respectively, then a CPG or CPGs, as implementations may have multiple CPGs in series and/or parallel, may be reused at least three or four times for a bandlimited signal. This may include pipelining CPGs 120. Effectively, this reduces resources used in an FPGA implementation, and may reduce semiconductor area in an ASIC or other IC implementation. Again, in this example, samples with a sampling frequency of a 1.2 multiple of 80 MHz, generally at least 96 MHz, are referred to as 1× samples, and in this example, input signal 102 is bandlimited to 80 MHz.

Accordingly, any intermediate sample may be reconstructed from 1× samples as described herein for band-limited signals. Along those lines, a less complex and more cost effective interpolation may be implemented in peak detector 110 to determine peak locations accurately for such 1× sampling, and such samples may be subsequently used for 1× cancelling of, or more particularly scaling to reduce, peaks by a CPG 120.

As described herein, for 1× PC-CFR operation, both peak-detection and cancellation work with 1× input samples. CPGs 120, or more generally cancellation, can work with 1× samples; however, peak detection may employ some extra intelligence for working with 1× input samples. Along those lines, this extra intelligence in peak detection may be applied to interpolation, as well as optionally to peak qualification, for detected peaks. Moreover, this extra intelligence may be used to detect peaks when 1× samples are substantially below a set threshold, such as for example in wide bandwidth applications where a signal envelope can swing in the range of 3 to 6 dB or more between two 1× samples. Additionally, this extra intelligence may be used to enhance peak accuracy. Along those lines, use of 1× samples may have a coarser time granularity for peak magnitude and time resolution as compare with 4× samples for example. As described below in additional detail, accuracy of such 1× samples may be enhanced to comparable with 4× samples to avoid having peaks under-compensated during cancellation stage.

To avoid missed peaks and to avoid inaccurate or under-compensated peaks, peak detector 110 may work with interpolated samples of a 1× PC-CFR 140, but instead of interpolating the whole of a data path of 1× PC-CFR 140, only samples around peaks may be interpolated. Interpolator 230 may be configured for a truncated sinc interpolation, namely a truncated sinc interpolator. Sinc interpolation or other form of bandlimited interpolation, such as windowed sinc interpolation for example, may preserve a bandlimited character of input samples, as well as be used for resolving difficult multi-carrier signal configurations, such as for example when only two edge carrier signals are loaded over an entire transmit spectrum.

FIGS. 4-1 and 4-2 collectively are a mathematical representation ("Equation (1)") depicting an exemplary interpolator 400 having a left-side peak portion 405 and a right-side peak portion 415. Again, interpolator 400 may be a form of bandlimited interpolation. Interpolator 400 may be used as interpolator 230 of FIG. 2-1. With reference to FIGS. 2-1, 4-1, and 4-2, interpolator 400 is further described.

An output of a dot product of transpose ("T") matrices 402 and 410 is a transpose matrix 401 in FIG. 4-1, which represents a left-side/increasing-side of a positive peak. An output of a dot product of matrices 412 and 410 is a matrix 411 in FIG. 4-2, which represents a right-side/decreasing-side of a positive peak. These may likewise be used for negative peaks.

L/R peak-side detector 220 of FIG. 2-1 may be coupled to interpolator 203 to provide an L/R select signal 222 to interpolator 203. L/R select signal 222 may be used to select either matrix 402 or 412 for use in interpolator 400. Matrix 410, which is a coefficient matrix, may be the same for both left and right sides of a peak. For purposes of clarity by way of example and not limitation, interpolator 400 is configured to interpolate 1× samples in matrices 402 and 412 to provide a 7-order interpolation for peak detector 110 to detect a signal peak. For example, 7-order interpolation may have 7 samples of 1× signal around a peak used for interpolation. This 7-order interpolation is one such implementation, and in another implementation, an N-order interpolation, for N greater or less than 7 may be used in accordance with the description herein for meeting a detection accuracy with complexity/cost of implementation tradeoff therefor. While less than a 7-order interpolation may be used, namely 7 samples in matrices 402 and 412, it shall be assumed that at least a 7-order interpolation is used to provide sufficient accuracy for many applications.

Samples in matrices 401 and 411 are effectively interpolated samples, corresponding to 4x samples, which may be used by circuitry of peak detector 110.

Accordingly, samples in matrix 402 are generally indicated as $X_{4m}$, $X_{4m+4}$, $X_{4m-4}$, $X_{4m+8}$, $X_{4m-8}$, $X_{4m+12}$, $X_{4m-12}$, and samples in matrix 412 are generally indicated as $X_{4m}$, $X_{4m-4}$, $X_{4m+4}$, $X_{4m-8}$, $X_{4m+8}$, $X_{4m-12}$, $X_{4m+12}$. Accordingly, it should be understood that both matrices 402 and 412 have the same set of 1x samples, but in different orders. Even though an example of 4x interpolation is described herein, in another implementation a greater sample multiplier may be used. For example, 5x or 6x interpolation may be used in accordance with the description herein for sufficient detection accuracy with cost/complexity of implementation tradeoff.

In coefficient matrix 410, each column 421 through 423 represents a separate phase of an input signal 102. Coefficients in column 421 are $h_1$, $h_3$, $h_5$, $h_7$, $h_9$, $h_{11}$, $h_{13}$. Coefficients in column 422 are $h_2$, $h_2$, $h_6$, $h_6$, $h_{10}$, $h_{10}$, $h_{14}$. Coefficients in column 423 are $h_3$, $h_1$, $h_7$, $h_5$, $h_{11}$, $h_9$, $h_{15}$. Accordingly, for 1x samples to be interpolated to provide interpolated samples in either of matrices 401 and 411, each coefficient $h_n$ is a interpolation filter coefficient with 4x interpolation. Furthermore, each sample $x_n$ is equal to zero for all n not integrally divisible by four. For example, indices of 7 samples are all divisible by 4, assuming zero padding before interpolation filtering. There are no coefficients $h_0$, $h_4$, $h_9$, $h_{12}$, for 4x interpolation for a sinc or a sinc-like filter as there are no zero crossings at n=4, 8, 12, and so on and $h_0=1$, as indicated by Equation (1) of FIG. 4-2 and Equations (2a) and (2b) below. Along those lines, filter complexity may be further reduced.

Equation (1) of FIGS. 4-1 and 4-2 use a common 7 samples at 1x to interpolate one 4x sample around a signal peak input signal 102. This may be thought of as a 7-order interpolation, meaning that each interpolation uses 7 samples at 1x around a signal peak, namely a center sample and three samples on either side of such a center sample.

Both sides, namely both a left-side peak portion 405 and a right-side peak portion 415, may be used together; however, by having L/R peak-side detector 220 coupled to interpolator 203 to provide an L/R select signal 222 to interpolator 203, one matrix dot product may be avoided in order to use less resources.

Again, L/R select signal 222 may be used to select either matrix 402 or 412 for use in interpolator 400. Therefore, in this example, either interpolated samples, namely dot product results, $\hat{X}_{4m+1}$, $\hat{X}_{4m+2}$, $\hat{X}_{4m+3}$ or $\hat{X}_{4m-1}$, $\hat{X}_{4m-2}$, $\hat{X}_{4m+3}$ may be used.

Figure 5:
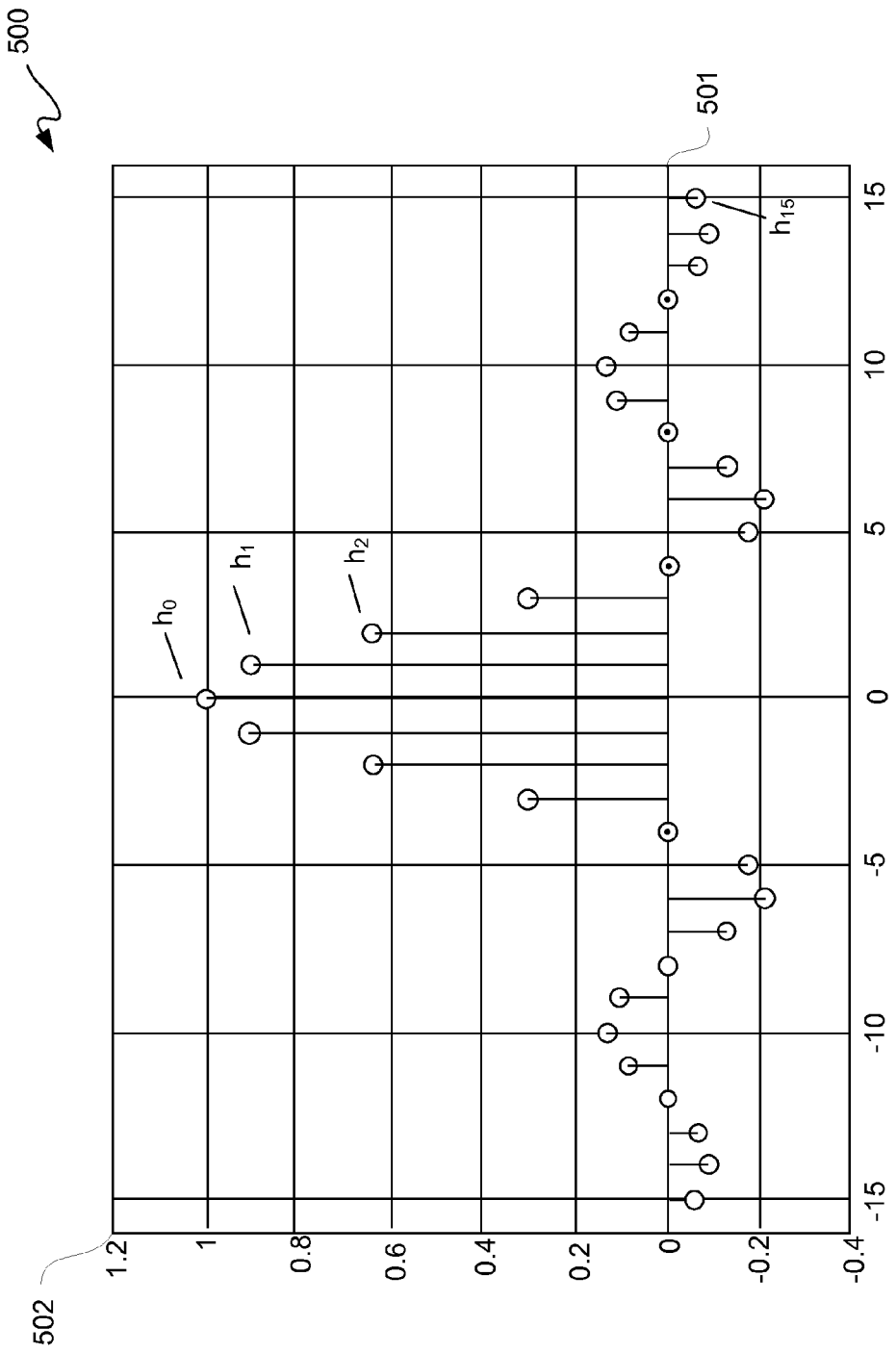
FIG. 5 is a plot diagram depicting exemplary interpolator filter impulse response coefficients $h_n$.

FIG. 5 is a plot diagram depicting exemplary interpolator filter impulse response coefficients $h_n$ in a plot 500. In plot 500, an x-axis 501 is for −15 to 0 to 15 corresponding to negative coefficients $-h_{15}$ through $-h_1$ and $+h_1$ through $+h_{15}$ on either side of a center coefficient $h_0$. In plot 500, these coefficients may correspond to different scaling multipliers as indicated along y-axis 502. In this example, such scaling multipliers range from approximately −0.2 to 1.0. Thus, coefficients $h_n$ in plot 500 may be used to form an h-coefficients matrix 410, which in this example is for a 7-tap interpolation, for effectively multiplying such coefficients with 1x samples to provide results matrices 401 and 411.

Equation (1) may be simplified, as interpolated samples may be expressed as:

$$h_0=1, h_{4n}=0, \forall n \neq 0, \text{ and} \quad (2a)$$

$$h_n=h_{-n}, \forall n \quad (2b)$$

Because of the relationship in Equation (2b), only a positive set of coefficients may be used for coefficient matrix 410.

Figure 6:
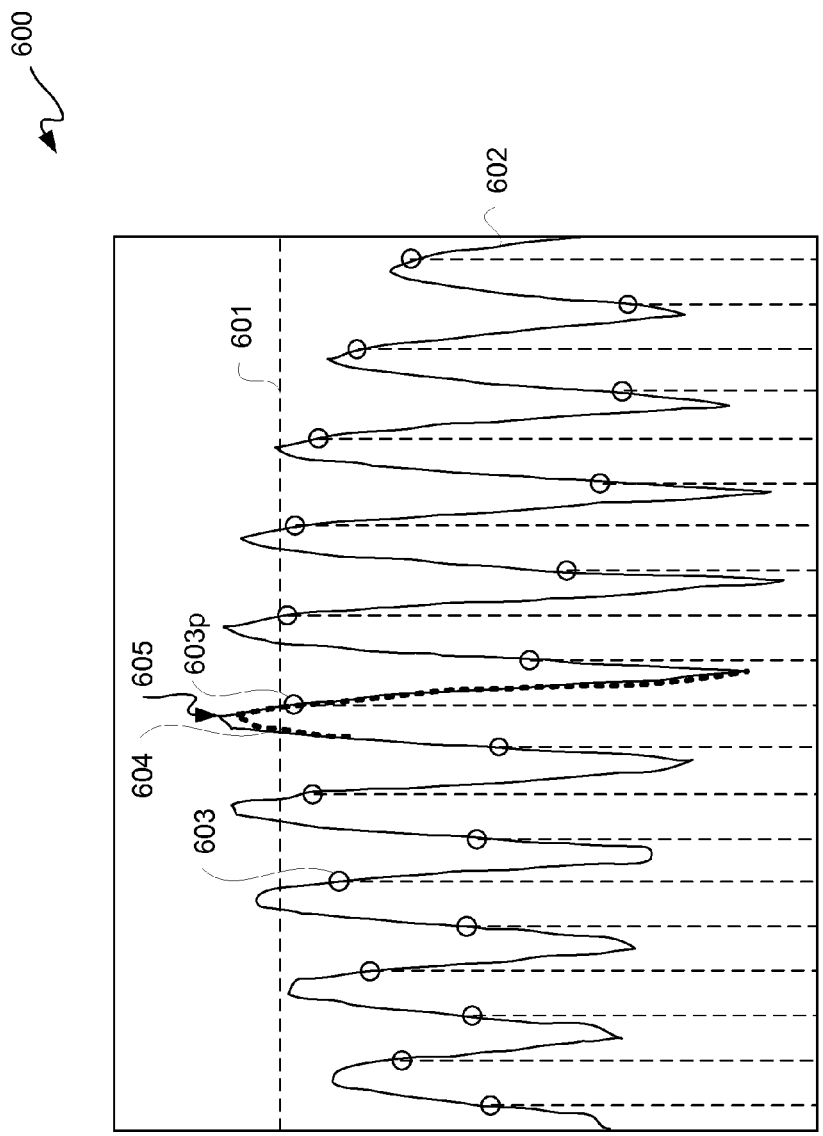
FIG. 6 is a plot diagram depicting an exemplary sinc reconstruction using 7-order interpolation.

For purposes of clarity by way of example and not limitation, FIG. 6 is a plot diagram depicting an exemplary sinc reconstruction 600 using 7-order interpolation continuing the above example. Using the equations of FIG. 4-1 or 4-2, in FIG. 6 a sinc response due to all 7 samples at 1x are combined together to reconstruct total 6 samples around a peak, such as peak 605 for example. In this example, dashed line 601 indicates an amplitude threshold 115 of FIG. 1. Interpolated samples 604 (shown with a heavy dotted line) can be compared with generated 4x samples 602 obtained from a resample function for a sinc filter. Circles 603 indicate where 1x samples are obtained, and a circle 603P indicates an example peak sample. Such a peak sample 603 may be interpolated on either side thereof to locate a peak 605.

Accordingly, interpolated samples 604 may closely comport with 4x samples. Again, even though 1x samples in FIGS. 4-1 and 4-2 are interpolated to accurately mimic 4x samples, equations of FIGS. 4-1 and 4-2 may be modified to for 3x or 5x, or some other, interpolation. Accordingly, for example, interpolation covering 3x to 5x peak detection interpolation, and likewise corresponding cancellation pulse interpolation, may be used; however, cancellation is for 1x sampling. In other words, cancellation may always happen at 1x.

Continuing the above example, there may be sample phases 0 through 3, phases and fractional timing offset δ associated therewith may be between [−3, 3], for example as follows: 0/0, −1/3, −2/2, −3/1, and so on. In other words, between samples $X_0$ and $X_4$ there may be samples $\hat{X}_1$, $\hat{X}_2$, $\hat{X}_3$ if 4x sampling were used, and these interpolated samples may correspond to phases 1 through 3. In other words, because 1x sampling and not 4x sampling is used, effectively samples $\hat{X}_1$, $\hat{X}_2$, $\hat{X}_3$ may be constructed or reconstructed as three sampling phases using a low cost interpolator 230 by a peak detector 110. However, this interpolation by peak detector 110 may be qualified, so interpolation is only performed on peaks.

Along those lines, input signal 102 may be received by angle determination block 210 of a phase qualifier 250 to assert an activation output signal 212 indicating whether phase differences between phases of samples may be used to indicate a peak or not. Phase difference may be indicated with 1x samples, which 1x samples may be index divisible by 4 for 4x samples. For example for a peak at $X_{4m}$, peak qualification by angle determination block 210 may use phases of $X_{4m}$, $X_{4m+4}$, and $X_{4m-4}$. A threshold may be applied to reconstructed samples, $\hat{X}$, namely 4x samples around a peak in this example. Along those lines, a peak may be detected with 1x samples with interpolation around a detected peak to provide 4x samples, where interpolation may be used for enhanced peak resolution. Optionally, prior to interpolation by interpolator 230, peak qualification may be used to reduce interpolation complexity by use of left/right ("L/R") peak-side detector 220 of peak qualifier 250, so that either samples to the left or the right of detected peak are interpolated and then a threshold may be applied to reconstructed samples. If differences indicate a peak, angle determination block 210 may assert output signal 212 to L/R peak-side detector 220 to select either a left side order or right side order of samples to use for interpolation. L/R peak-side detector 220 may provide output signal 222 to interpolator 230 to indicate which subset of samples to use for interpolation. For example, angle determination block 210 and L/R peak-side detector 220 may indicate that a peak is between either a previous sample or a next sample with respect to sample $X_{4m}$, namely between either $X_{4m-4}$ and $X_{4m}$ or $X_{4m}$ and $X_{4m+4}$. In other words, the top three samples in either matrix 402 or 412 may be evaluated for determining which side a peak is on by L/R peak-side detector 220. Along those lines, interpolator 230 may use either a left-side/positive side peak portion 405 or a right-side/negative-side peak portion 415 responsive to a left indicating state or a right indicating state, respectively, of output signal 222.

Accordingly, not all samples are interpolated, as samples may be first angle determination qualified to indicate whether a peak is present, and then only those peak indicating samples may be subsequently interpolated. Moreover, optionally, for those peak indicating angle determination qualified samples, they may be secondly peak-side selected to subsequently perform interpolation on only a significant half of such samples. Because not all of the samples are interpolated, this implementation of interpolator 230 may be contrasted from a filter.

A k-order interpolation may have k real-complex, or 2 k real, multiply-and-add operations per interpolation with one known/constant coefficient. This k-order interpolation can be implemented in FPGA fabric with LUTs and multipliers exploiting having one coefficient constant for each. In addition to k-order interpolation, peak-detection by peak detector 110 may process interpolated samples to detect and locate a peak with fractional sampling phase offset.

Equations of FIGS. 4-1 and 4-2 may be applied to a peak $X_{4m}$ that satisfies the following relationships:

$$|x_{4m}| > |x_{4m+4}| \text{ and } |x_{4m}| - |x_{4m-4}|. \tag{3}$$

In other words, a peak $X_{4m}$ is between plus and minus phase offsets from such peak. For purposes of clarity and not limitation, a right side peak, namely for $\delta > 0$, is presumed. Thus, an interpolated peak from a right side offset may be expressed as:

$$\hat{x}_{4m} + \delta,$$

where using Equation (3), this interpolated peak may be related to other interpolated peaks from fraction sampling phase offsets as follows:

$$|\hat{x}_{4m-\delta}| > |\hat{x}_{4m+\delta+1}| \text{ and } |\hat{x}_{4m+\delta}| > |\hat{x}_{4m+\delta-1}|, \tag{4}$$

where for the above example:

$$\delta \in [-3, 3].$$

Equation (4) gives a fractional timing offset δ, which may be used to decimate a cancellation pulse to 1× during cancellation in CPGs, such as CPG 120. In another implementation, assuming cancellation pulse is pre-generated and stored at 4×, a cancellation pulse can be generated in-place with this fractional timing offset. Continuing the above example, for a cancellation pulse generated with 4× interpolation, length L of such pulse may be L samples, n ∈[0, L−1]. Such a cancellation pulse $C_n$ may be decimated to a 1× cancellation pulse, and such decimated cancellation pulse $\hat{C}_n$ may be denoted as follows:

$$\hat{C}_n = C_{\phi + 4n}. \tag{5}$$

Where, continuing the above 4× interpolation example, an initial sampling phase φ in Equation (5) may be expressed as:

$$\Phi = mod\left(\frac{L-1}{2} - \delta, 4\right). \tag{6}$$

With above equations borne in mind, application of a cancellation pulse may be expressed as:

$$y_n = x_n - \alpha_{N_0} \hat{C}_{n+k-N_0}, \text{ where, } k = \left\lfloor \frac{L-1-2\delta}{8} \right\rfloor \text{ and} \tag{7}$$

$$\alpha_{N_0} = \left(|\hat{X}_{\delta+4N_0}| - T\right) e^{j\Phi_{N_0}}, \Phi_{N_0} = \angle \hat{X}_{\delta+4N_0}. \tag{8}$$

In Equations (7) and (8), $x_n$ is a sampled input signal in output signal 104 and $y_n$ is an output signal 105 after peak cancellation by a single CPG 120. In other words, each CPG 120 may apply a separate cancellation pulse $\hat{C}_n$ to an incoming sampled input signal. In this example, a peak to be cancelled so as to be scaled down to be at or below a threshold amplitude T is assumed to be located at n=$N_0$ with an initial sampling phase therefor at $\Phi_{N_0}$. Scaling factor $\alpha_{N_0}$ may be determined from reconstructed samples at 4× in this example with a fractional timing offset δ. Such a fractional timing offset may then be applied to a decimated cancellation pulse obtained from Equation (5). A center tap of a 4× cancellation pulse may be assumed to be unity. Accordingly, from Equation (7), it may be seen that multiple multipliers, adders, addressable memory spaces, and so on may be implemented in a CPG 120. Accordingly, being able to use and reuse a CPG 120 may conserve resources. For example, a CPG core may be implemented in an FPGA using FPGA resources to provide a CPG 120, and by being able to use a lower sampling rate, such CPG 120 may be reused. For example, CPG 120 may be pipelined for operation thereof. After peak detection, a check to determine if a peak is above a threshold 115 may be performed using reconstructed/interpolated samples in accordance with Equation (8).

While 7-order interpolation may be sufficient for many applications, some non-contiguous carrier configurations may use more taps, such as up to 9-order interpolation. Each k-order interpolation may produce 3 complex samples with peak qualification as previously described, and so for 4× there may be 12 (i.e., 4 multiplied by 3 complex samples each) for k multipliers for k-order interpolation, or a total of 12 k multipliers. However, as can be seen from the structure of an interpolation matrix in Equation (1), each of columns 421 through 423 of coefficient matrix 410 corresponds to a phase of interpolated samples, namely a first column 421 corresponds to a first phase, a second column 422 corresponds to a second phase, and a third column 423 corresponds to a third phase. These first and third phases of interpolated samples can be computed with 7 multipliers; however, due to duplicate coefficients in second column 422, such second phase can be computed by just 4 (5 multipliers for 9-order) multipliers for 7-order interpolation. If a 9-order interpolation were used, these numbers are 9 multipliers and 5 multipliers, respectively. These multipliers can be time-shared if clocked at a speed higher than a 1× sampling rate, namely at an integral multiple of a sampling rate for example.

As previously described, complexity can further be reduced by selectively choosing left or right side samples with respect to a peak for interpolation using L/R peak-side detector 220. For example, in FIG. 6, there may be a total of 6 samples to be interpolated on either side of a peak 605 as indicated in Equation (1). A side of these samples in which a peak is going to appear after interpolation may be predicted based on phases of 1× samples. Peaks likely appear on a side where phase change is slower than on the other side. Thus, for example in FIG. 4-2, a left 3 samples only may be interpolated if the following inequality is true:

$$|\angle x_{4m} - \angle X_{4m+4}| > |\angle x_{4m} - \angle X_{4m-4}|. \quad (9)$$

If the inequality of Equation (9) is not true, then a right 3 samples only may be interpolated in accordance with FIG. 4-2. Thus, interpolation complexity may be reduced by a factor of two using L/R peak-side detector 220.

Figure 7:
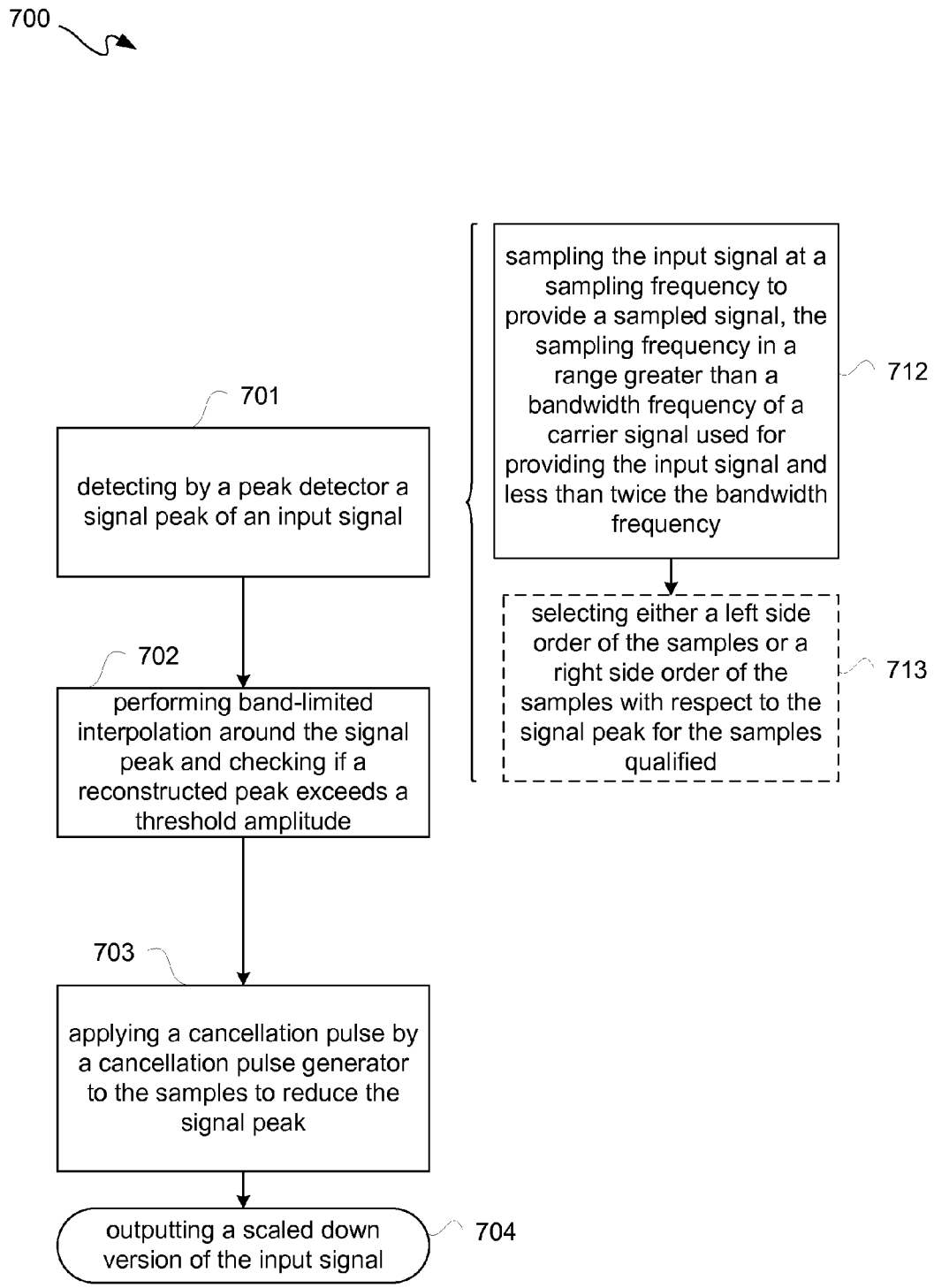
FIG. 7 is a flow diagram depicting an exemplary crest factor reduction ("CFR") flow for data transmission.

FIG. 7 is a flow diagram depicting an exemplary CFR flow 700 for data transmission. CFR flow 700 may be used prior to input of data to a power amplifier (not shown) for wireless data transmission. CFR flow 700 is further described with simultaneous reference to FIGS. 1 through 7.

At 701, a peak detector 110 may detect a signal peak of an input signal 102. This detection at 701 may include operations 712 and 713. At 712, input signal 102 may be sampled at a sampling frequency to provide a sampled signal. This sampling frequency may be in a range greater than a bandwidth frequency of a carrier signal used for providing input signal 102 and less than twice such bandwidth frequency. Again, a sampling frequency of peak detector 110 for obtaining such sampled signal and a clock rate of a CPG 120 may both be in this range.

Optionally at 712, samples of such sampled signal may be phase qualified by angle determination block 210 for detecting of a signal peak prior to interpolating. Optionally at 713, either a left side order of such qualified samples or a right side order of such qualified samples with respect to a signal peak may be selected by L/R peak-side detector 220 for interpolation. At 702, such qualified left or right side samples selected may be interpolated by interpolator 230. These interpolated samples thus are at least proximate to a signal peak in an input signal 102. This interpolation may be a truncated sinc interpolation or other type of interpolation. Threshold 115 may be provided to interpolator 230 to determine if a peak is above threshold 115 using reconstructed/interpolated samples in accordance with Equation (8).

At 702, band-limited interpolation may be performed around a signal peak detected at 701 to provide a reconstructed peak. Furthermore, at 702, a check may be made to determine if a reconstructed peak from such band-limited interpolation exceeds a predetermined threshold amplitude. At 703, a cancellation pulse may be applied by at least one CPG 120 to such interpolated samples. This cancellation pulse may be applied for peak cancellation by a scaled cancellation pulse.

Application at 703 of a scaled cancellation pulse by a cancellation pulse generator to samples to cancel peaks which, if allowed to pass without cancellation would exceed an amplitude threshold when reconstructed by band-limited interpolation. Accordingly, application of a scaled cancelation pulse to input signal 102 may be to reduce an associated signal peak thereof. At 704, a reduced or scaled down version of input signal 102 may be output, where peaks of input signal 102 in excess of an amplitude threshold are reduced or scaled down to be equal to or less than such amplitude threshold set by threshold input 115.

Figure 8:
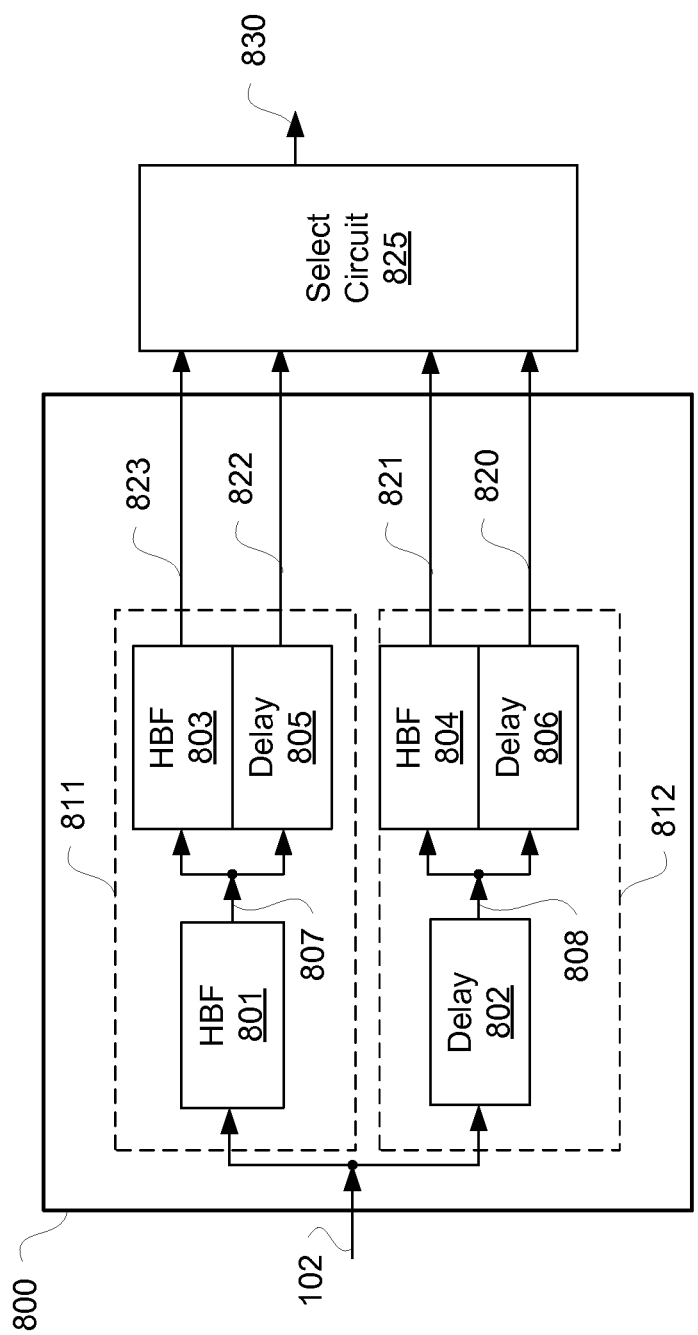
FIG. 8 is a block diagram depicting an exemplary halfband interpolator.

Interpolator 230 may be other than a truncated sinc interpolator 400. For example, FIG. 8 is a block diagram depicting an exemplary halfband interpolator 800 for halfband interpolation. Interpolator 800 may be interpolator 230 of FIG. 2-1. Interpolator 800 in combination with select circuit 825 may be a peak detector peak detector 110, as described below in additional detail.

Halfband interpolator 800 includes halfband filter circuits 811 and 812, at least one of which has a series of halfband filters ("HFBs"). For example, HBF 801 is coupled in series with HBF 803 in halfband filter circuit 811. Halfband filter circuits 811 and 812 may be commonly coupled to receive input signal 102. Halfband interpolator 800 follows from the above-example of 4× interpolation of 1× samples; however, in other implementations, other numbers of HFB and delay stages may be used.

Halfband filter circuit 811 may include HBF 801, HBF 803, and delay 805. Delay 805 may correspond to delay of first stage filtered signal 807 passing through HBF 803. Along those lines, HBF 801 and corresponding delay 802 may form or be in a first stage of halfband interpolator 800, and HBF 803 and corresponding delay 805, as well as HBF 804 and corresponding delay 806, may form or be in a second stage of halfband interpolator 800. HBF 801 may receive input signal 102 to provide first stage filtered signal 807. HBF 803 and delay 805 may be commonly coupled to receive first stage filtered signal 807. Output from HBF 803 may be a third phase filtered output 823, and output from delay 805 may be a second phase filtered output 822.

Halfband filter circuit 812 may include delay 802, HBF 804, and delay 806. Delay 806 may correspond to delay of first stage delayed signal 808 passing through HBF 804. Delay 802 may receive input signal 102 to provide first stage delayed signal 808. HBF 804 and delay 806 may be commonly coupled to receive first stage delayed signal 808. Output from HBF 804 may be a first phase filtered output 821, and output from delay 806 may be a delayed version of input signal 102, namely input signal 820.

HBF 801 and delay 802 form a first stage of interpolator 800. HBF 803 and delay 805, as well as HBF 804 and delay 806, are of a second stage of interpolator 800. Along those lines, outputs 820 through 823 of interpolator 800 are second stage outputs.

Again, interpolator 800 may be for 4× interpolation. A first 2× interpolation may be performed by a first halfband filter, namely HBF 801, and then a next or second 2× interpolation may be performed by a second smaller halfband filter, such as HBF 803. Both HBF 803 and 804 can be symmetric with HBF 801, where each of/the combination of HBF 803 and 804 may have double the length of HBF 801. In the example implementation illustratively depicted in FIG. 8, there may be 6 separate taps for HBF 801 and 3 separate taps for each of HBFs 803 and 804.

Delay of delay 802 may correspond to delay of HBF 801 with respect to filtering of input signal. Likewise, delays of delays 805 and 806 may correspond to one another. Accordingly delay of halfband filter circuits 811 and 812 may generally be equal.

First, second, and third phase filtered outputs 821 through 823, respectively, along with input signal 820, may be provided as output signal 104 for input to a CPG 120. Output signals 821 through 823 may correspond to samples in matrix 401 or 411. Output signals 820 through 823 may be provided to a select circuit 825 for providing a selected phase output 830. Along those lines, select circuit 825 may be configured to output a largest magnitude of output signals 820 through 823 as selected phase output 830. In an implementation with half-band filters, detecting at 701 includes receiving input signal 102 for filtering of 1× samples to produce a binary number of data streams, which in this example is four 1× data streams, namely output signals 820 through 823. Filtering in this example is equivalent to 4× sampling. Then at 701, these data streams or output signals 820 through 823 may be input to select circuit 825 with a threshold 115 on these samples to select a largest magnitude thereof in excess of such threshold. Peak qualification of operations 712 and 713, as well as interpolation at 702, may thus may be avoided. After filtering and selecting for detecting at 701, operations at 703 and 704 may be performed, as previously described on a selected phase output 830.

To recapitulate, samples of an incoming signal can be processed for example at approximately 1.2 times a bandwidth for peak cancellation at 1× sampling rate. A low cost constant coefficient interpolator can be used for peak detection leaving data path operating at 1× sampling rate. This may reduce resource usage, such as FPGA resource use of DSP48s and BRAMs for example, by time sharing. For example, a composite transmit signal of 100 MHz bandwidth carrier may be processed at a sampling rate of 122.88 MHz, while a CPG core, including DSP48s, BRAMs and other components, may be clocked at 491.52 MHz (e.g., 4×122.88) for reusing resources four times. In other words, such a CPG core may be reused, as sampling rate and a core clock rate of such CPG core may both be the same rate or at least both may fall into the above defined 1× rate. Moreover, a wide transmit bandwidth, namely equal to or greater than 150 MHz, may be supported as sampling rate may be substantially lower than a conventional 3×-5× multiple of such bandwidth frequency. For example, for a composite bandwidth in a range of approximately 150-200 MHz, a sampling rate of 245.76 MHz may be used. Further, for example, for a composite bandwidth in a range of approximately 200-300 MHz, a sample rate of 368.64 MHz may be used, and so on. These lower sampling rates may be used in lower cost ICs not capable of handling higher frequencies. However, more particularly, use of lower frequencies may lead to lower power consumption, as well as less giving off of heat.

Because one or more of the examples described herein may be implemented in an FPGA, a detailed description of such an IC is provided. However, it should be understood that other types of ICs may benefit from the technology described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 9:
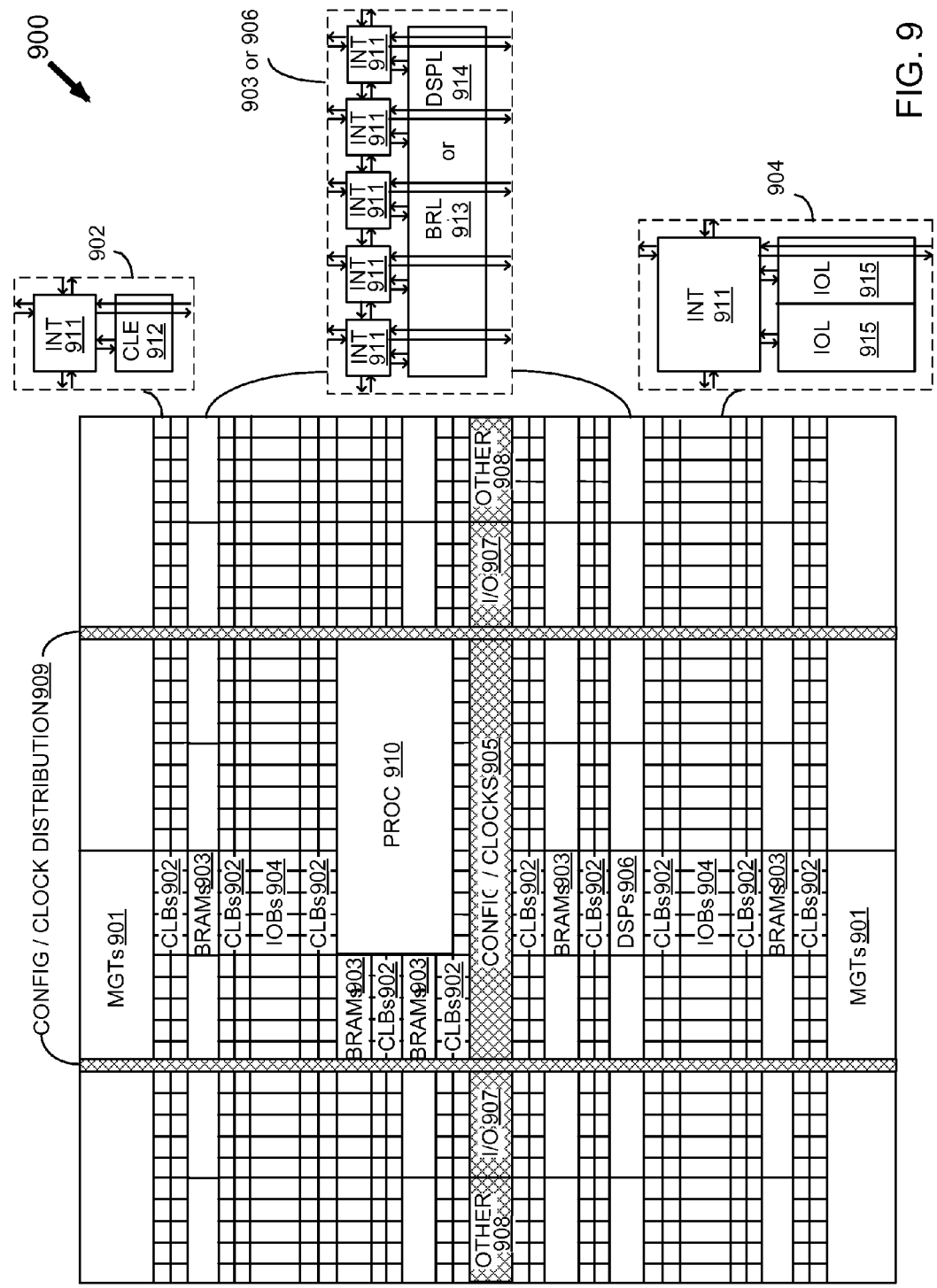
FIG. 9 is a simplified block diagram depicting an exemplary columnar Field Programmable Gate Array ("FPGA") architecture.

As noted above, advanced FPGAs can include several different types of programmable logic blocks in the array. For example, FIG. 9 illustrates an FPGA architecture 900 that includes a large number of different programmable tiles including multi-gigabit transceivers ("MGTs") 901, configurable logic blocks ("CLBs") 902, random access memory blocks ("BRAMs") 903, input/output blocks ("IOBs") 904, configuration and clocking logic ("CONFIG/CLOCKS") 905, digital signal processing blocks ("DSPs") 906, specialized input/output blocks ("I/O") 907 (e.g., configuration ports and clock ports), and other programmable logic 908 such as digital clock managers, analog-to-digital converters, system monitoring logic, and so forth. Some FPGAs also include dedicated processor blocks ("PROC") 910.

In some FPGAs, each programmable tile includes a programmable interconnect element ("INT") 911 having standardized connections to and from a corresponding interconnect element in each adjacent tile. Therefore, the programmable interconnect elements taken together implement the programmable interconnect structure for the illustrated FPGA. The programmable interconnect element 911 also includes the connections to and from the programmable logic element within the same tile, as shown by the examples included at the top of FIG. 9.

For example, a CLB 902 can include a configurable logic element ("CLE") 912 that can be programmed to implement user logic plus a single programmable interconnect element ("INT") 911. A BRAM 903 can include a BRAM logic element ("BRL") 913 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 906 can include a DSP logic element ("DSPL") 914 in addition to an appropriate number of programmable interconnect elements. An IOB 904 can include, for example, two instances of an input/output logic element ("IOL") 915 in addition to one instance of the programmable interconnect element 911. As will be clear to those of skill in the art, the actual I/O pads connected, for example, to the I/O logic element 915 typically are not confined to the area of the input/output logic element 915.

In the pictured embodiment, a horizontal area near the center of the die (shown in FIG. 9) is used for configuration, clock, and other control logic. Vertical columns 909 extending from this horizontal area or column are used to distribute the clocks and configuration signals across the breadth of the FPGA.

Some FPGAs utilizing the architecture illustrated in FIG. 9 include additional logic blocks that disrupt the regular columnar structure making up a large part of the FPGA. The additional logic blocks can be programmable blocks and/or dedicated logic. For example, processor block 910 spans several columns of CLBs and BRAMs.

Note that FIG. 9 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 9 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method for data transmission, comprising:
   detecting by a peak detector a signal peak of an input signal exceeding a threshold amplitude;
   wherein the detecting comprises sampling the input signal at a sampling frequency to provide a sampled signal, the sampling frequency in a range greater than a bandwidth frequency of a carrier signal used for providing the input signal and less than twice the bandwidth frequency;
   interpolating samples of the sampled signal proximate to the signal peak with a bandlimited interpolation to provide a reconstructed peak;
   applying a cancellation pulse by a cancellation pulse generator to the samples to reduce the signal peak; and
   outputting a version of the input signal after application of the cancellation pulse.

2. The method according to claim 1, wherein the sampling frequency and a clock rate of the cancellation pulse generator are both in the range.

3. The method according to claim 2, wherein the sampling frequency and the clock rate are equal to one another.

4. The method according to claim 1, wherein the interpolating comprises:
   checking if the reconstructed peak exceeds the threshold amplitude; and
   using a truncated sinc interpolation for the bandlimited interpolation.

5. The method according to claim 4, wherein the truncated sinc interpolation comprises the interpolating of the samples to provide at least 7-order interpolation for the detecting by the peak detector.

6. The method according to claim 1, wherein the interpolating comprises using a halfband interpolation.

7. The method according to claim 6, wherein the halfband interpolation comprises using stages of halfband filters and corresponding delays.

8. The method according to claim 1, wherein the detecting further comprises phase qualifying the samples for the detecting of the signal peak prior to the interpolating.

9. The method according to claim 8, wherein the detecting further comprises selecting either a left side order of the samples or a right side order of the samples with respect to the signal peak for the samples qualified prior to the interpolating.

10. An apparatus for data transmission, comprising:
    a peak detector for receiving an input signal for detecting a signal peak in the input signal exceeding a threshold amplitude;
    the peak detector for sampling the input signal at a sampling frequency to provide a sampled signal;
    wherein the sampling frequency is in a range greater than a bandwidth frequency of a carrier signal used for providing the input signal and less than twice the bandwidth frequency;
    the peak detector for interpolating samples of the sampled signal proximate to the signal peak;
    wherein an interpolator of the peak detector is configured to interpolate the samples with a bandlimited interpolation; and
    a cancellation pulse generator for applying a cancellation pulse to the input signal to reduce the signal peak.

11. The apparatus according to claim 10, wherein the sampling frequency and a clock rate of the cancellation pulse generator are both in the range.

12. The apparatus according to claim 11, wherein the sampling frequency and the clock rate are equal to one another.

13. The apparatus according to claim 10, wherein the interpolator of the peak detector is a truncated sinc interpolator for the bandlimited interpolation.

14. The apparatus according to claim 13, wherein the truncated sinc interpolator is configured to interpolate the samples to provide at least 7-order interpolation for the peak detector to detect the signal peak.

15. The apparatus according to claim 10, wherein the interpolator of the peak detector is a halfband interpolator.

16. The apparatus according to claim 15, wherein the halfband interpolator comprises stages of halfband filters and corresponding delays.

17. The apparatus according to claim 10, wherein a phase qualifier of the peak detector is for receiving the input signal for asserting an activation signal indicating a sample of the samples is associated with the signal peak.

18. The apparatus according to claim 17, wherein the phase qualifier of the peak detector is configured for using the activation signal for selecting either a left side order of the samples or a right side order of the samples of the signal peak for the interpolating.

19. A system for a transmitter, comprising:
    a peak detector for receiving an input signal for detecting a signal peak in the input signal exceeding a threshold amplitude;
    the peak detector for sampling the input signal at a sampling frequency to provide a sampled signal;
    wherein the sampling frequency is in a range greater than a bandwidth frequency of a carrier signal used for providing the input signal and less than twice the bandwidth frequency;
    the peak detector having:

an angle determination block for receiving the input signal for providing an activation signal indicating samples of the sampled signal are associated with a peak;

a peak-side detector for receiving the activation signal for selecting either a left side order of the samples or a right side order of the samples of the signal peak; and an interpolator for interpolating either the left side order of the samples or the right side order of the samples selected;

a cancellation pulse generator for applying a cancellation pulse to the input signal to reduce the signal peak for outputting a version of the input signal; and a windowed crest factor reduction block for cleaning the version of the input signal.

20. The system according to claim 19, wherein the sampling frequency and a clock rate of the cancellation pulse generator are both in the range.

* * * * *